United States Patent [19]

Welder et al.

[11] 4,118,318

[45] Oct. 3, 1978

[54] GAS SCRUBBER SCALE AND DEPOSIT CONTROL

[75] Inventors: Gerald Elvin Welder, Hudson; Edward Russell Lang, Lakewood, both of Ohio; Charles Wilmer Slagle, Wexford, Pa.

[73] Assignee: Calgon Corporation, Pittsburgh, Pa.

[21] Appl. No.: 835,625

[22] Filed: Sep. 22, 1977

Related U.S. Application Data

[63] Continuation-in-part of Ser. No. 733,723, Oct. 26, 1976, abandoned, which is a continuation-in-part of Ser. No. 647,253, Jan. 7, 1976, abandoned.

[51] Int. Cl.$^2$ ............................................. C02B 5/06
[52] U.S. Cl. .................................... 210/58; 252/175; 252/180; 134/41; 422/9
[58] Field of Search .................. 252/175, 180; 210/58; 136/41; 21/2.7 R

[56] References Cited

U.S. PATENT DOCUMENTS

| Re. 28,553 | 9/1975 | Freyhold | 252/175 |
| --- | --- | --- | --- |
| 2,337,856 | 12/1943 | Rice et al. | 252/175 X |
| 3,630,937 | 12/1971 | Baum et al. | 252/175 X |
| 3,663,448 | 5/1972 | Ralston et al. | 252/180 |
| 3,806,367 | 4/1974 | Lange et al. | 210/58 X |
| 3,880,620 | 4/1978 | Lange et al. | 252/175 X |

*Primary Examiner*—Mayer Weinblatt
*Attorney, Agent, or Firm*—Rudolph J. Anderson, Jr.; Mario A. Monaco; Martin L. Katz

[57] ABSTRACT

Use of a high molecular weight polymer and a scale inhibitor to control deposit build-up in gas scrubbers.

19 Claims, No Drawings

GAS SCRUBBER SCALE AND DEPOSIT CONTROL

CROSS REFERENCE TO RELATED APPLICATIONS

This application is a continuation-in-part of U.S. Ser. No. 733,723, filed Oct. 26, 1976, which is a continuation-in-part of U.S. Ser. No. 647,253, filed Jan. 7, 1976, now both abandoned.

BACKGROUND OF THE INVENTION

During recent years, the number of wet scrubber systems installed to remove gaseous and particulate material from waste stack gases has increased tremendously. Additional such systems are on the drawing board now. These wet scrubbers are being used to clear effluent from boiler stacks, incinerator stacks, lime kilns, foundries, blast furnaces, basic oxygen furnaces (BOF), open hearth units, coke plants, paper mill recovery boilers, pet food manufacturing facilities, electric furnaces (steel and aluminum), smelters, asphalt plants and many others.

One of the most important features of a scrubber system is the contact chamber, the device used to effect transfer of gaseous and/or particulate matter from the gas to the water phase. Most wet scrubber systems involve a venturi, a packed bed, an orifice plate, a spray chamber or a turbulent bed. Some systems even use two contact chambers in series, for example, a venturi followed by a spray chamber.

Venturi or orifice plate scrubbers are generally more efficient for particulate removal while packed beds, turbulent beds and spray chambers are usually more efficient for removing gaseous components such as $SO_2$ and HF.

The present invention is directed specifically to those scrubber systems where scaling and deposition problems due to insoluble calcium carbonate, calcium fluoride, iron oxide ($Fe_2O_3$), silica, manganese oxide, iron ore fines and slag fines are encountered. The type problem which the present invention minimizes is that which is found in gas scrubber systems of blast furnace operations where iron ore is being converted or processed to iron having a high carbon content.

In order to assure a complete understanding of the problem to which the present invention is addressed, a brief description of a blast furnace operation is hereafter provided.

In the production of iron, iron ore is fed together with additional ingredients such as dolomite through the top of a blast furnace fired by coke. An air stream is blown upward from the bottom of the furnace through the subsequent molten materials. The carbon of the coke reduces the iron ore ($Fe_2O_3$) to iron metal. The molten iron is tapped from the bottom of the furnace while the slag is tapped from the middle of the furnace. The by-product of the carbon reduction is of course a combination of carbon dioxide and carbon monoxide which reacts with the calcium present to form the troublesome scaleformer, calcium carbonate and other solids: clay, slag, fines, etc.

As can be appreciated, the air stream blown upward contributes significantly to the impurity content of the flue gas, thus putting an extreme burden on the scrubbing system. The particulate load in the scrubbing medium ranges from about 1,000 to 2,000 parts per million because of the particulate load of the flue gas.

The scrubbers that are used in blast furnace gas clean-up are often of the Venturi design and treat the off-gases from the furnace. These gases contain significant quantities of iron oxide, whose fine particle size allows it to be carried off in the gas stream. Also present may be coke fines, to a lesser extent and to some extent, particulate slag materials used, such as silicates and unused dolomites. The iron oxide has been subjected to high temperatures within the furnace and may therefore be in a sintered form of low surface activity. However, its fine particle size presents deposition problems in scrubbers and delivery lines.

Another example of an operative system is a basic oxygen furnace (BOF) in which the BOF receives molten metal from the blast furnace plus scrap, various alloys to meet specifications, and lime and fluorspar as a flux. Oxygen is introduced through a lance to remove impurities. The oxygen blow can release 4.4 tons of dust per 220 ton heat. This dust must be removed from the waste gas. The dust consists of iron oxide, lime and fluoride.

This particulate and soluble gases are removed from the waste gas in a wet scrubber. In the scrubber water the iron oxide, calcium fluoride and calcium carbonate combine to cause massive deposit build-up on the scrubber system intervals which result in inefficient scrubber operation and high maintenance costs.

Prior art methods, such as the method set forth in U.S. Pat. No. 3,880,620, employ scale inhibitors, i.e., inorganic and organic phosphates; and low molecular weight polymeric dispersants. This approach has not been completely successful in preventing deposition and has resulted in increased treatment costs and frequent shutdowns for mechanical cleaning.

Accordingly, it is an object of this invention to provide a composition and method of effectively preventing deposits in gas scrubbers.

It is a further object of this invention to provide a composition and method for preventing deposits in gas scrubbers which is economical and which minimizes the frequency of mechanically cleaning scrubber equipment.

It is still a further object of this invention to provide a composition and method of preventing deposits in gas scrubbers which is effective over a wide range of pH conditions.

These and other objects of this invention are accomplished by the composition and method of this invention in which from about 0.01 to about 100 ppm active ingredients, preferably from about 0.1 to about 10 ppm active ingredients, of a composition comprising a scale inhibitor and a high molecular weight polymer is maintained in the aqueous scrubbing medium. The ratio of scale inhibitor to high molecular weight polymer may be from about 1:10 to about 10:1, preferably from about 1:5 to about 5:1, by weight.

Suitable threshold scale inhibitors include phosphonates of the general formula:

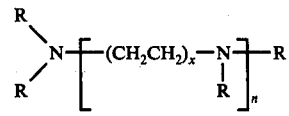

wherein R is

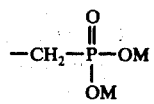

M is H, NH$_4$, alkali metal or combinations thereof;
n is 0 to 6; and
x is 1 to 6; and those of the general formula:

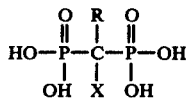

wherein X is — OH or — NH$_2$ and R is an alkyl group of from 1 to 5 carbon atoms. The most preferred compounds, however, are amino tris (methylene phosphonic acid) and hydroxyethylidene-1, 1-diphosphonic acid (HEDP) and water-soluble salts thereof.

Also useful as threshold scale inhibitors are phosphates such as polyphosphates, as for example sodium polyphosphates and phosphate esters of the formula:

wherein M may be — H, — NH$_2$ or a monovalent metal ion and R is an alkylene group having from 1 to 18 carbon atoms. Suitable polyphosphates are disclosed in U.S. Pat. Nos. 2,337,856, 2,906,599 and 3,213,017.

Suitable high molecular weight polymers include any nonionic or anionic water-soluble polymer having a molecular weight of at least 100,000, preferably at least 250,000, and the most preferred polymers having a molecular weight of at least 1,000,000. Examples of suitable polymers include polyacrylamides such as those set forth in U.S. Pat. No. 3,085,916, polymers of 2-acrylamido methyl propane sulfonic acid such as those set forth in U.S. Pat. No. 3,709,816, and sulfonated polystyrenes such as those set forth in U.S. Pat. No. 3,630,937.

The invention is further illustrated by the following examples:

EXAMPLE 1

10 ppm of a composition comprising a high molecular weight copolymer of 2-acrylamido methyl propane sulfonic acid and acrylamide and a scale inhibitor [amino tris (methylene phosphonate)] in a weight ratio of 1:2.5 was maintained in the water supply to a basic oxygen furnace recycle scrubber system for 13 weeks at which time the system was visually inspected and no visible deposition was observed in the pumps, valves or sprays. This is in contrast to heavy fouling of pumps, sprays and valves, which resulted in loss of gas washing and cooling efficiencies, thereby causing temporary loss of production, that occurred in a two-week period with no treatment. Previously, this system was heavily contaminated with calcium carbonate and contained significant amounts of ferric oxide.

EXAMPLE 2

6.6 ppm of a composition comprising a high molecular weight copolymer of 2-acrylamido methyl propane sulfonic acid and acrylamide and a scale inhibitor [amino tris (methylene phosphonate)] in a weight ratio of 1:2.5 was maintained in the water supply to a basic oxygen furnace quencher and venturi scrubber system that had a severe build-up of calcium fluoride, iron oxide and calcium carbonate. After 1600 heats, the system was inspected and the gas ducts, scupper gratings and nozzles were observed to be clean.

EXAMPLE 3

15 ppm of a composition comprising a high molecular weight copolymer of 2-acrylamido methyl propane sulfonic acid and acrylamide and a scale inhibitor [amino tris (methylene phosphonate)] in a weight ratio of 1:2.5 was maintained in the water supply to a blast furnace scrubber system having heavy iron deposits, which had previously resulted in an increase in the top pressure in the furnace resulting in furnace production loss and shutdown for descaling within one week when a low molecular weight (approximately 1000) polyacrylate and amino tris (methylene phosphonate) were used. After six weeks of treatment with the high molecular weight polymer/scale inhibitor compositions of this invention, no pressure increase or build-up was observed and the system is operating normally.

EXAMPLE 4

In order to simulate conditions in a gas scrubber system, a synthetic water was prepared which had a pH of 12.0, a suspended solids (hydrated ferric oxide) concentration of 2000 mg/l, a sodium hydroxide concentration of 200 mg/l, a sodium bicarbonate concentration of 260 mg/l, a calcium concentration of 450 mg/l and a fluoride concentration of 40 mg/l. The water was maintained at a temperature of 140°±4° F. and circulated through the test system at a linear velocity of between 3 and 4 ft./sec. The test system contained an unheated test section (12 inches long), a heated section (12 inches long), a spray section and a drain section. The inhibitor was added to the synthetic water which was then circulated through the system for five hours at which time the system was shut down and the test sections weighed and the present inhibition calculated in accordance with the following formula:

$$\% \text{ inhibition} = 1 - \left[ \frac{\text{wt. of deposit (inhibited)}}{\text{wt. of deposit (control)}} \right] \times 100$$

The results of these tests are set forth in Table I.

Table I

| Test # | Product and Ratio | Concentration (ppm) | Weight Gained in Grams (unheated, heated, drain) | % Inhibition |
|---|---|---|---|---|
|  | Control | — | 8.21 | — |
|  |  |  | 8.325 | — |
|  |  |  | 10.425 | — |
| 1 | Calgon/ | 5.0 | 3.29 | 59.9 |
|  | Polymer 1 |  | 2.91 | 65.0 |
|  | 1:1 |  | 1.31 | 87.4 |
| 2 | AMP/ | 5.0 | 0.88 | 89.3 |
|  | Polymer 1 |  | 0.59 | 92.9 |
|  | 1:1 |  | 1.16 | 88.9 |
| 3 | HEDP/ | 5.0 | 1.67 | 79.7 |
|  | Polymer 1 |  | 1.56 | 81.3 |
|  | 1:1 |  | 0.97 | 90.7 |
| 4 | Calgon/ | 5.0 | 0.50 | 93.9 |
|  | Polymer 2 |  | 0.68 | 91.8 |
|  | 1:1 |  | 1.20 | 88.5 |
| 5 | AMP/ | 5.0 | 0.69 | 91.6 |
|  | Polymer 2 |  | 0.60 | 92.8 |
|  | 1:1 |  | 1.23 | 88.2 |
| 6 | HEDP/ | 5.0 | 0.80 | 90.3 |
|  | Polymer 2 |  | 0.55 | 93.4 |
|  | 1:1 |  | 1.41 | 86.5 |
| 7 | Calgon/ | 10.0 | 0.42 | 94.9 |
|  | Polymer 3 |  | 0.45 | 94.6 |
|  | 1:5 |  | 1.42 | 86.4 |

Table I-continued

| Test # | Product and Ratio | Concentration (ppm) | Weight Gained in Grams (unheated, heated, drain) | % Inhibition |
|---|---|---|---|---|
| 8 | AMP/ Polymer 3 5:1 | 5.0 | 8.35 6.25 11.54 | −1.7* 24.9 −10.7* |
| 9 | HEDP/ Polymer 3 1:1 | 0.1 | 0.52 0.46 1.80 | 93.7 94.5 82.7 |
| 10 | Calgon/ Polymer 4 1:5 | 10.0 | 3.50 3.31 4.23 | 57.4 60.2 59.4 |
| 11 | AMP/ Polymer 4 5:1 | 5.0 | 5.98 5.38 6.38 | 27.2 35.4 38.8 |
| 12 | HEDP/ Polymer 4 1:1 | 0.1 | 2.21 1.80 1.53 | 73.1 78.4 85.3 |
| 13 | Calgon/ Polymer 5 1:1 | 0.1 | 0.34 0.33 0.60 | 95.9 96.0 94.2 |
| 14 | AMP/ Polymer 5 1:5 | 10.0 | 1.49 1.40 ** | 81.9 83.2 ** |
| 15 | HEDP/ Polymer 5 5:1 | 5.0 | 2.68 2.16 1.99 | 67.4 74.1 80.9 |
| 16 | Calgon/ Polymer 6 1:1 | 0.1 | 0.62 0.61 1.65 | 92.4 92.7 84.2 |
| 17 | AMP/ Polymer 6 1:5 | 10.0 | 2.22 2.07 2.86 | 73.0 75.1 72.6 |
| 18 | HEDP/ Polymer 6 5:1 | 5.0 | 4.31 3.80 2.70 | 47.5 54.4 74.1 |
| 19 | Calgon/ Polymer 7 5:1 | 5.0 | 0.43 0.51 1.02 | 94.8 93.9 90.2 |
| 20 | AMP/ Polymer 7 1:1 | 0.1 | 0.67 0.57 0.44 | 91.8 93.2 95.8 |
| 21 | HEDP/ Polymer 7 1:5 | 10.0 | 0.66 0.86 1.14 | 92.0 89.7 89.1 |
| 22 | Calgon/ Polymer 8 5:1 | 5.0 | 0.57 0.58 1.59 | 93.1 93.0 84.7 |
| 23 | AMP/ Polymer 8 1:1 | 0.1 | 0.72 0.51 1.27 | 91.2 93.9 87.8 |
| 24 | HEDP/ Polymer 8 1:5 | 10.0 | 1.84 1.70 1.64 | 77.6 79.6 84.3 |

*Values reflect weight gain greater than control value.
**Weights of drain section were not taken since heavy flocculation resulted in more mechanical entrapment than deposit accumulation.

| Product Designations | |
|---|---|
| Calgon | sodium hexametaphosphate |
| AMP | amino tris (methylene phosphonic acid) |
| HEDP | 1-hydroxyethylidene-1, 1-diphosphonic acid |
| Polymer 1 | 49/51 copolymer of acrylamide and 2-acrylamido-2-methyl propane-1-sulfonic acid having a molecular weight of approximately 1,000,000 |
| Polymer 2 | homopolymer of 2-acrylamido-2-methyl propane-1-sulfonic acid having a molecular weight of approximately 500,000 |
| Polymer 3 | high molecular weight unhydrolyzed polyacrylamide having a molecular weight of approximately 1,000,000 |
| Polymer 4 | low molecular weight sodium acrylate having a molecular weight of approximately 700–1,000 |
| Polymer 5 | high molecular weight hydrolyzed (15%) polyacrylamide having a molecular weight of approximately 1,000,000 |
| Polymer 6 | low molecular weight hydrolyzed (50%) polyacrylamide having a molecular weight of approximately 8,000 |
| Polymer 7 | sulfonated polystyrene having a molecular weight of approximately 700,000 |
| Polymer 8 | sulfonated polystyrene having a molecular weight of approximately 6,000–8,000 |

We claim:
1. A composition useful for controlling deposit build-up in gas scrubbers consisting essentially of a scale inhibitor selected from the group consisting of:
   a. phosphonates of the general formula:

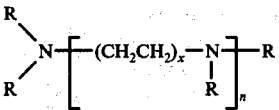

wherein R is

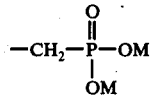

M is H, $NH_4$, alkali metal or combinations thereof;
N is 0 to 6; and
x is 1 to 6;
   b. phosphonates of the general formula:

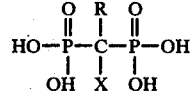

wherein X is — OH or — $NH_2$ and R is an alkyl group of from 1 to 5 carbon atoms; and
   c. sodium polyphosphates and phosphate esters of the formula:

$N + ROPO_3M_2]_3$ wherein M may be — H, — $NH_2$ or a monovalent metal ion and R is an alkylene group having from 1 to 18 carbon atoms;
and at least one water-soluble polymer selected from the group consisting of polyacrylamides, poly(2-acrylamido methyl propane sulfonic acid) and sulfonated polystyrenes, said polymer having a molecular weight of at least 25,000 wherein the ratio of scale inhibitor to polymer is from about 1:10 to about 10:1 by weight.

2. A composition as in claim 1 wherein the scale inhibitor is amino tris (methylene phosphonate).

3. A composition as in claim 1 wherein the polymer is a copolymer of acrylamide and 2-acrylamido methyl propane sulfonic acid or its water-soluble salts.

4. A composition as in claim 1 wherein the polymer is a polyacrylamide.

5. A composition as in claim 1 wherein the polymer is sulfonated polystyrene.

6. A composition as in claim 1 wherein the scale inhibitor is a polyphosphate.

7. A composition as in claim 6 wherein the polyphosphate is sodium hexametaphosphate.

8. A composition as in claim 1 wherein the scale inhibitor is a phosphonate of the formula:

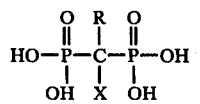

wherein X is — OH or — NH$_2$ and R is an alkyl group of from 1 to 5 carbon atoms, or a water-soluble salt thereof.

9. A composition as in claim 8 wherein the scale inhibitor is hydroxyethylene-1, 1-diphosphonic acid or a water-soluble salt thereof.

10. A composition useful for controlling deposit build-up in gas scrubbers consisting essentially of amino tris (methylene phosphonate) and a copolymer of acrylamide and 2acrylamido methyl propane sulfonic acid or its water-soluble salts having a molecular weight of at least 250,000 wherein the weight ratio of phosphonate to polymer is from 1:5 to 5:1.

11. A method of controlling deposit build-up in gas scrubbers which comprises maintaining in the aqueous scrubbing medium at least 0.01 ppm of a composition consisting essentially of a scale inhibitor selected from the group consisting of:

a. phosphonates of the general formula:

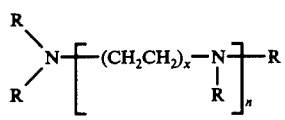

wherein R is

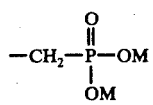

M is H, NH$_4$, alkali metal or combinations thereof; n is 0 to 6; and
x is 1 to 6;

b. phosphonates of the general formula:

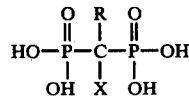

wherein X is — OH or — NH$_2$ and R is an alkyl group of from 1 to 5 carbon atoms; and c. sodium polyphosphates and phosphate esters of the formula:

wherein M may be — H, — NH$_2$ or a monovalent metal ion and R is an alkylene group having from 1 to 18 carbon atoms; and at least one water-soluble polymer selected from the group consisting of polyacrylamides, poly(2-acrylamido methyl propane sulfonic acid) and sulfonated polystyrenes, said polymer having a molecular weight of at least 250,000, wherein the ratio of scale inhibitor to polymer is from about 1:10 to about 10:1 by weight.

12. A method as in claim 11 wherein the polymer is sulfonated polystyrene.

13. A method as in claim 11 wherein the polymer is a polyacrylamide.

14. A method as in claim 11 wherein the polymer is a copolymer of acrylamide and 2-acrylamido methyl propane sulfonic acid or its water-soluble salts.

15. A method as in claim 11 wherein the scale inhibitor is amino tris (methylene phosphonate).

16. A method as in claim 11 wherein the scale inhibitor is a phosphonate of the formula:

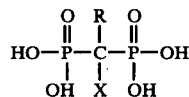

wherein X is — OH or — NH$_2$ and R is an alkyl group of from 1 to 5 carbon atoms, or a water-soluble salt thereof.

17. A method as in claim 16 wherein the scale inhibitor is hydroxyethylidene-1, 1-diphosphonic acid or a water-soluble salt thereof.

18. A method as in claim 11 wherein the polyphosphate is sodium hexametaphosphate.

19. A method as in claim 11 wherein the scale inhibitor is a polyphosphate.

* * * * *

UNITED STATES PATENT OFFICE
CERTIFICATE OF CORRECTION

Patent No. 4,118,318            Dated October 3, 1978

Inventor(s)    GERALD ELVIN WELDER ET AL

It is certified that error appears in the above-identified patent and that said Letters Patent are hereby corrected as shown below:

In Column 6, Claim 1, line 21, "N" should read "n".

In Column 6, Claim 1, line 44, "25,000" should read "250,000".

In Column 7, Claim 10, line 11, "2acrylamido" should read "2-acrylamido".

Signed and Sealed this

Twentieth Day of February 1979

[SEAL]

Attest:

RUTH C. MASON  
Attesting Officer

DONALD W. BANNER  
Commissioner of Patents and Trademarks